Aug. 11, 1953  H. J. WOOD  2,648,491
GAS TURBINE AUXILIARY POWER PLANT
Filed Aug. 6, 1948  6 Sheets-Sheet 1

INVENTOR:
HOMER J. WOOD
BY HIS ATTORNEYS
HARRIS, KIECH, FOSTER & HARRIS
BY

Aug. 11, 1953  H. J. WOOD  2,648,491
GAS TURBINE AUXILIARY POWER PLANT
Filed Aug. 6, 1948  6 Sheets-Sheet 2

INVENTOR:
HOMER J. WOOD
BY HIS ATTORNEYS
HARRIS, KIECH, FOSTER & HARRIS
BY

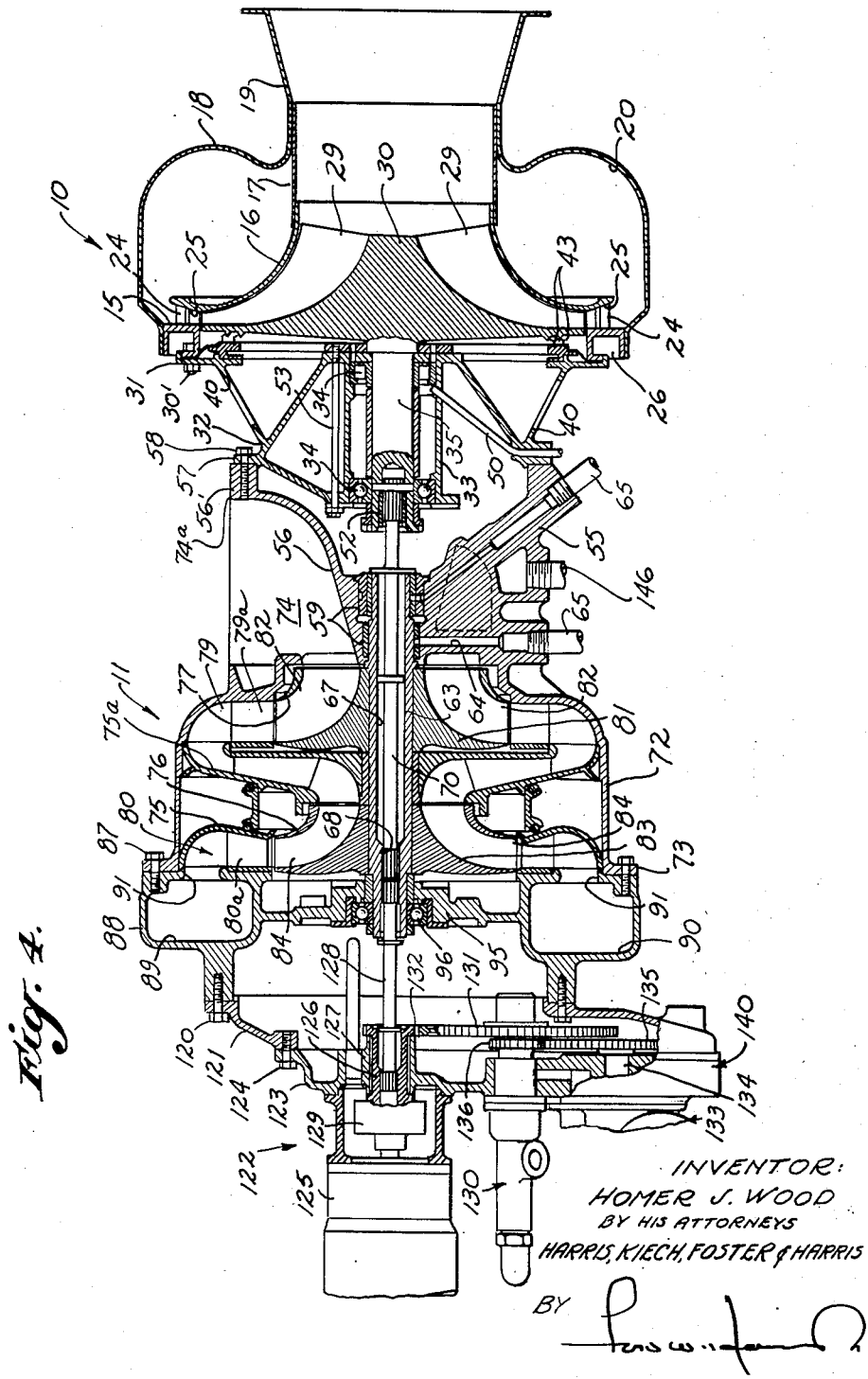

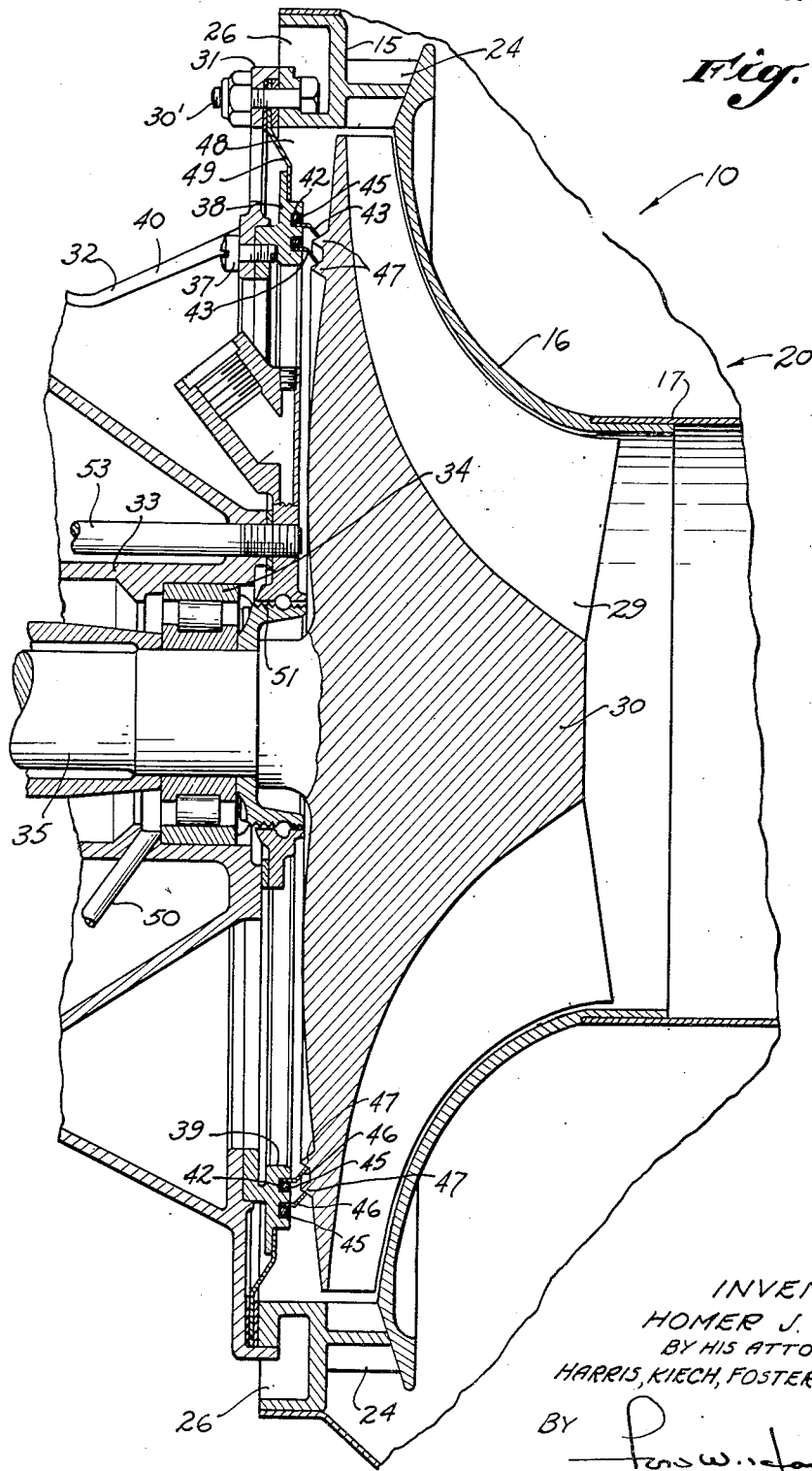

Aug. 11, 1953 H. J. WOOD 2,648,491
GAS TURBINE AUXILIARY POWER PLANT
Filed Aug. 6, 1948 6 Sheets-Sheet 6

INVENTOR:
HOMER J. WOOD
BY HIS ATTORNEYS
HARRIS, KIECH, FOSTER & HARRIS

Patented Aug. 11, 1953

2,648,491

UNITED STATES PATENT OFFICE 2,648,491

GAS TURBINE AUXILIARY POWER PLANT

Homer J. Wood, Sherman Oaks, Calif., assignor to The Garrett Corporation, Los Angeles, Calif., a corporation of California Application August 6, 1948, Serial No. 42,984

1 Claim. (Cl. 230—116)

This invention relates generally to power plants and, more particularly, to a hot gas turbine compressor unit especially adapted as a source of auxiliary power aboard an aircraft.

It is highly desirable in aircraft of the larger types that an auxiliary power means be provided for starting the engines, for operating electrical generators, cabin supercharging equipment and other accessories so that the full power developed by the aircraft engines can be utilized for propelling the airplane. It is also important that such an auxiliary power unit be very compact so that it occupies a minimum space, and light in weight so that the weight of the aircraft is not materially increased or its pay-load decreased to any appreciable degree.

It is an important object of this invention to provide a power unit which meets the above-noted requirements and which is highly efficient in operation, delivering maximum power per unit of weight.

Another object of the invention is to provide a power unit of the hot gas turbine compressor type which is adapted to supply power either through a mechanical drive or in the nature of compressed air for directly or indirectly operating various mechanisms and controls, such as those employed in aircraft.

Another object is to provide a turbo-compressor in which the compressor may supply air to the airplane pneumatic system as well as to the hot gas turbine, the air supplied to the combustion chambers for the turbine being divided at the entrances or inlet ports of the combustion chambers. In accordance with the invention, at least one combustion chamber is provided, in which fuel is burned to heat the "power" air, this air then being expanded through the hot gas turbine.

Another object is to provide a turbo-compressor power unit which includes a hot gas turbine, a compressor and an accessory case for controlling the operation of the unit, these components being arranged in a line in the order named and each being a separate entity capable of being disassembled from the power unit for repair, inspection and testing. The combustion chambers are disposed at opposite sides of the assembly referred to above and adapted for convenient detachment from the power unit assembly without disturbing the other components and this is another object of the invention.

Another object is to provide a power unit, of the class referred to, in which the individual components are designed such that the unit as a whole is small, compact and light in weight and thus particularly adapted for use in aircraft.

Another object is to provide a turbo-compressor power unit in which slender torsion bars or shafts are employed for transmitting power from the turbine to the compressor so that slight misalignment between major components can occur without presenting mechanical difficulties. By this means, exact alignment of the components is unnecessary and precision fitting of the various housings composing the unit is avoided.

Another object is to provide a power unit of the type indicated in which a two-stage compressor having backwardly curved impeller vanes and a double-volute discharge opening is employed. By this construction, wide variation in air flow rate, without pulsation hazard or serious efficiency loss is effected, the two stages being required to provide sufficient air pressure due to the backward curved impeller vanes, and the double-volute discharge producing better aerodynamic balance, heater unit configuration and simplified scroll geometry.

Another object is to provide a turbo-compressor power unit in which the hot gas turbine is of the radial inward-flow reaction type having radial blades. A turbine of this type is much simpler to manufacture than axial-flow turbines of comparable size and is capable of obtaining high efficiencies over a wide range of operating conditions. Moreover, the structural strength of such a turbine wheel is superior to one of comparable cantilever blade radial-flow type and to one of the axial-flow type.

Another object is to provide a power unit of the class designated in which the compressor impellers are fully shrouded so as to effectively reduce end thrust loads and obtain higher efficiencies.

Another object is to provide a power unit of the class referred to in which the turbine wheel and its shaft are machined from a single forging of refractory alloy, in which an air seal is provided at the rear of the wheel to balance axial thrust and inner portion of the wheel is exposed to ambient air for cooling purposes. Another object in this respect is to provide a turbine wheel of the radial inward-flow type, similar to a radial blade centrifugal compressor impeller, such a wheel lending itself to easier fabrication than conventional axial-flow wheels and having lower stresses than other wheels of radial-flow types.

A further object is to provide, in a turbine of the aforementioned type, means for sealing the turbine wheel to prevent loss of the pressurized gas from the turbine which would decrease the efficiency of the power unit in which the turbine is incorporated.

A still further and important object is to provide a hot gas turbine wherein the thrust on the wheel by the hot gas exhaust is balanced by an equal thrust on the outer peripheral back side of the wheel, which thrust is provided by the pressure of the hot gas at the exit from the nozzles, the remainder of the back side of the turbine wheel being cooled by ambient air.

Further objects of the invention will appear from the following detailed description and from the drawings, which are intended for the purpose of illustration only, and in which:

Fig. 4 is a longitudinal vertical sectional view, taken on line 4—4 of Fig. 1;

Fig. 5 is an enlarged sectional view of a portion of the hot gas turbine, showing the sealing means;

Fig. 6 is a schematic plan view of the power unit, indicating the air flow pattern.

Figure 1:
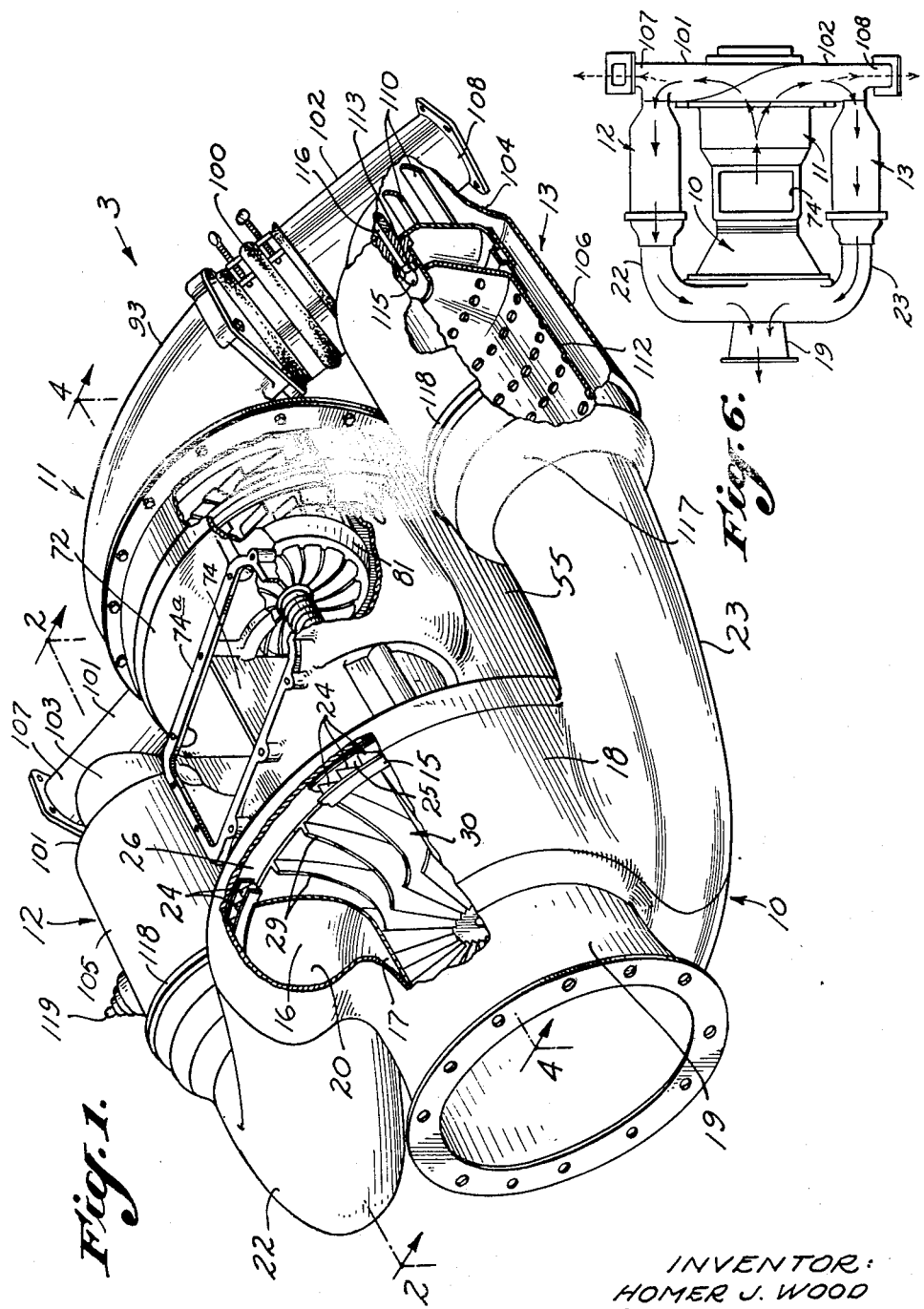
Figure 1 is a perspective view of the turbine compressor power unit.

Referring to Figs. 1 to 6 of the drawings in detail, the present improved power plant shown therein is of the hot gas turbine compressor type and includes a hot gas turbine, indicated generally by the reference character 10, a two-stage compressor 11 and a pair of combustion chambers 12 and 13. The turbine 10 and compressor 11 are disposed in axial alignment and each comprises a separate component or assembly adapted to be readily interchanged.

The hot gas turbine 10 includes a nozzle ring 15 which has a stator shroud 16 secured thereto, the shroud being curved inwardly and terminating in a tubular forward end 17, the inner side of which provides the exhaust tube of the turbine. An enclosure 18 surrounds and is affixed to the tube 17 and has its forward flared end 19 projecting beyond the end of the tube to provide an axial extension thereof. The enclosure 18 extends radially outward from the tube 17 and then rearwardly to be secured to the nozzle annulus 15. An annular hot gas inlet passage 20 is thus provided between the shroud 16 and the enclosure 18 into which hot gas is introduced by way of curved tubes 22 and 23 leading from the combustion chambers 12 and 13, respectively. The nozzle annulus 15 is provided with a series of inclined vanes 24 around its periphery, the spaces 25 between the vanes constituting nozzles through which the hot gas is directed against the blades 29 of a turbine wheel 30, to be later described. The nozzle annulus 15 is substantially channel shaped in cross section so as to provide an annular air space 26 in its rearward face, as best shown in Figs. 4 and 5.

Secured to a flange of the nozzle annulus 15 by means of bolts 30' is the peripheral portion 31 of a bearing housing 32 which has an axial sleeve-like portion 33. Within the sleeve portion 33, at the ends thereof, are anti-friction bearings 34 which rotatably support the shaft 35 of the turbine wheel 30, it being noted that the shaft 35 is formed integral with the wheel so as to obtain maximum strength and close balance. It will also be observed that the turbine wheel is of somewhat unconventional design, in that it is of a radially inward-flow reaction type and resembles an impeller of the radial blade type such as commonly employed in centrifugal compressors where the air is forced radially outward by the blades.

Secured to the annular portion 31 of the bearing housing 32, by screws 37, is an annular carrier member 38. By this provision, ambient air can contact the back of the turbine wheel 30 for the purpose of cooling the same, the air entering the housing 32 through apertures 40 in the side thereof. In its face which is disposed adjacent the wheel 30, the carrier member 38 has a pair of concentric annular grooves 42 for receiving annular sealing rings 43 which are held in place by snap-rings 45. The sealing rings 43, which are preferably made from stainless steel, are angular in cross section and have resilient portions 46 which engage against the outer inclined surfaces of V-shaped annular lands 47 formed on the back of turbine wheel 30. By this means, leakage of the hot gas from the rearward side of the turbine is prevented. The hot gas entering the turbine unit 10 from the combustion chambers 12 and 13 is received in an annular space 48 defined by the inner surface of the nozzle annulus 15, the back of the turbine wheel 30, the outer sealing ring 43, the carrier member 38 and a ring 49 secured between the member and annulus 15. This gas exerts a pressure against the outer peripheral portion of the back of the turbine wheel 30 and thus counteracts the rearward axial thrust of the turbine wheel and this is an important feature of the invention. It is thus seen that except for its outermost peripheral portion, the back of the turbine wheel 30 is exposed to ambient air and is cooled thereby. The bearings 34 for the turbine wheel shaft 35 are supplied with lubricant forced through a tube 50 connected to a suitable pump (not shown). A sealing device 51 is employed for preventing loss of the lubricant from the forward end of the sleeve portion 33. Fast within an axial bore at the inner end of the turbine shaft 35 is a sleeve 52 having a splined inner surface.

It will be observed from the foregoing that the turbine 10 is a self-contained unit capable of being made as a sub-assembly of the complete auxiliary power plant. It will also be apparent that the turbine unit 10 is particularly well adapted for convenient assembly and disassembly so that inspection of its internal parts and replacement thereof is greatly facilitated. To further facilitate the assembly and disassembly of the parts, the housing 32 and the carrier member 38 are connected by bolts 53 so that by removing the bolts 36', the bearing assembly, including the housing and carrier member can be detached from the nozzle annulus 15.

The hot gas turbine, which is of the radial inward-flow reaction type having radial blading has been found highly advantageous for several reasons. In the first place, fabrication of the turbine wheel is much simpler than for an axial-flow type wheel of comparable size. Moreover, the structural strength of the present turbine wheel is superior to comparable wheels of the cantilever-blade radial-flow types. Furthermore, it has been determined that high efficiencies over a wide range of operating conditions are derived through the use of the instant turbine unit.

The compressor unit 11, which is also made as a subassembly of the power plant, is of the two-stage type. The unit 11 includes a compressor housing 55 which has a forward funnel-shaped end 56 provided with a peripheral flange 56' which is adapted to abut the side of a similar flange 57 of the turbine bearing housing 32 and to be secured thereagainst by bolts 58. The end 56 of the compressor housing 55 has an axial bore in which bearing bushings 59 are held, these bushings providing bearings in which the forward end of a tubular compressor shaft 63 is adapted to rotate. Lubricant is supplied to these relatively rotating parts through passages 64 and lines 65 connected to the oil pump previously referred to. The compressor shaft 63 has a bore 67 which is reduced in diameter as indicated at 68, this reduced portion having splines on its interior. A quill shaft 70, which extends coaxially through the shaft 63, has splined ends which engage in the splined portions 68 and 52 of the shaft and the sleeve 52, respectively. It is thus seen that when the turbine wheel is driven, torque is imparted through the quill shaft 70 to rotate the shaft 63 and the compressor impellers carried thereby. The quill shaft 70 is adapted to flex and to twist somewhat so that it provides a substantially resilient driving connection between the turbine and the compressor units. Due to the flexibility of the quill shaft 70, substantially vibrationless performance is achieved. Moreover, the quill shaft makes for ease of assembly of the components of the power unit since it compensates for slight axial misalignment of the components.

The compressor housing 55 is provided with an enlarged generally cylindrical rearward portion 72 having a peripheral flange 73 at its rearward open end and an air inlet opening 74 in its forward wall. The opening 74 is in communication with an air inlet connection 74a intersecting a plane normal to the power plant axis which passes through both combustion chambers. It is to be noted that this inlet connection is spaced substantially upwardly from a plane extending through the upper surfaces of both of the combustion chambers, so that air may be supplied to the compressor unit without substantial heating by the combustion chambers, and thus enable bleed air for pneumatic power purposes to be obtained from the compressor, as will hereinafter be explained. A pair of annular chambers 79 and 80 are formed within the rear portion 72 of the housing 55, these chambers being defined by the wall of the housing, an annular plate 75, an annular wall structure 75a and shrouds 76 and 77. A first stage compressor wheel or impeller 81 is fast on the shaft 63 adjacent the bearing 59 and has rearwardly curved radial vanes 82 the inner forward portions of which register with the air inlet opening 74. Thus, during rotation of the compressor wheel 81 air drawn into the housing 72 is forced radially outward then radially inward and is compressed within the wheel and within the diffuser vane section 79a (Fig. 4). The air is then further compressed in a second stage compressor by the impeller 83 having similarly rearwardly curved radial vanes 84 and by the diffuser vane section 80a (Fig. 4), the air being directed radially outward into the second chamber 80 which, as will be shown hereinafter, communicates with the combustion chambers 12 and 13.

Figure 3:
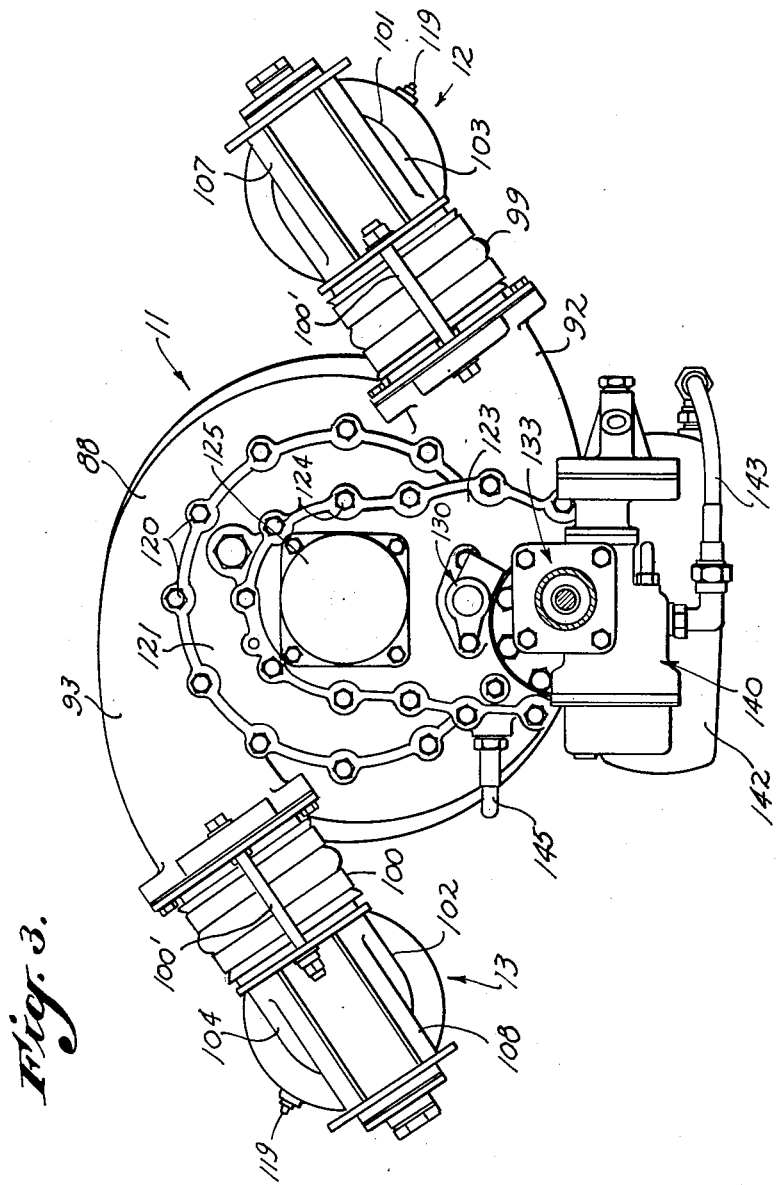
Fig. 3 is an end view as viewed in the direction of the arrow 3 in Fig. 1.

Secured to the peripheral flange 73 of the compressor housing 55, 72 by bolts 87 is an annular member 88 which has walls defining a pair of volute discharge passages 89 and 90 which communicate with the circular compression chamber 80 through openings 91. The walls of the passages 89 and 90 provide volute discharge ducts 92 and 93 which, as shown in Figs. 1 and 3, extend laterally outward from the compressor unit 11. As shown in Fig. 4, the member 88 has a central portion 95 which is provided with an axial bore in which suitable anti-friction bearing means, indicated at 96, is disposed. The bearing means 96 rotatably supports the rearward end of the tubular compressor shaft 63 and takes the axial thrust of the shaft. The bearing 96 is preferably lubricated by a pressure system (not shown).

The centrifugal compressor 11, which is of the two-stage type employing impellers provided with backward curved impeller vanes and having a double-volute discharge, has been found to be particularly suitable for use in the auxiliary power plant. The backward curved vanes permit wide variation in air flow rate without pulsation hazard or serious efficiency loss. The double-volute discharge provides greater aerodynamic balance, more desirable unit design and simplified scroll geometry. As will be noted from the foregoing description, the compressor unit 11 is designed as a separate unit and can be detached from the turbine unit 10 by merely removing the bolts 58, the forward end of the quill shaft 70 sliding out from the splined sleeve 52 to permit such disassembly. It will also be apparent that by disconnecting the scroll member 88 from the compressor housing portion 72, the shafts 63 and 70, together with the impellers 81 and 83, can be readily removed from the housing as a unit for inspection or reconditioning purposes.

In order to minimize radial bearing loads, the impellers are balanced as separate components prior to balancing of the complete assembly so as to prevent serious shaft deflections at high speed, it being pointed out that in the present power plant the impellers 81 and 83 are rotated at a maximum speed of approximately 40,000 R. P. M. The compressor impellers are fully shrouded, as shown in Fig. 4, so as to reduce end thrust loads and obtain higher efficiencies. The first stage impeller 81 has a short diffuser around its periphery and only a portion of the velocity reduction occurs at this point. The air passages which duct the air to the second stage inlet also function as diffusers, full diffusion being accomplished in the second stage diffuser.

Figure 2:
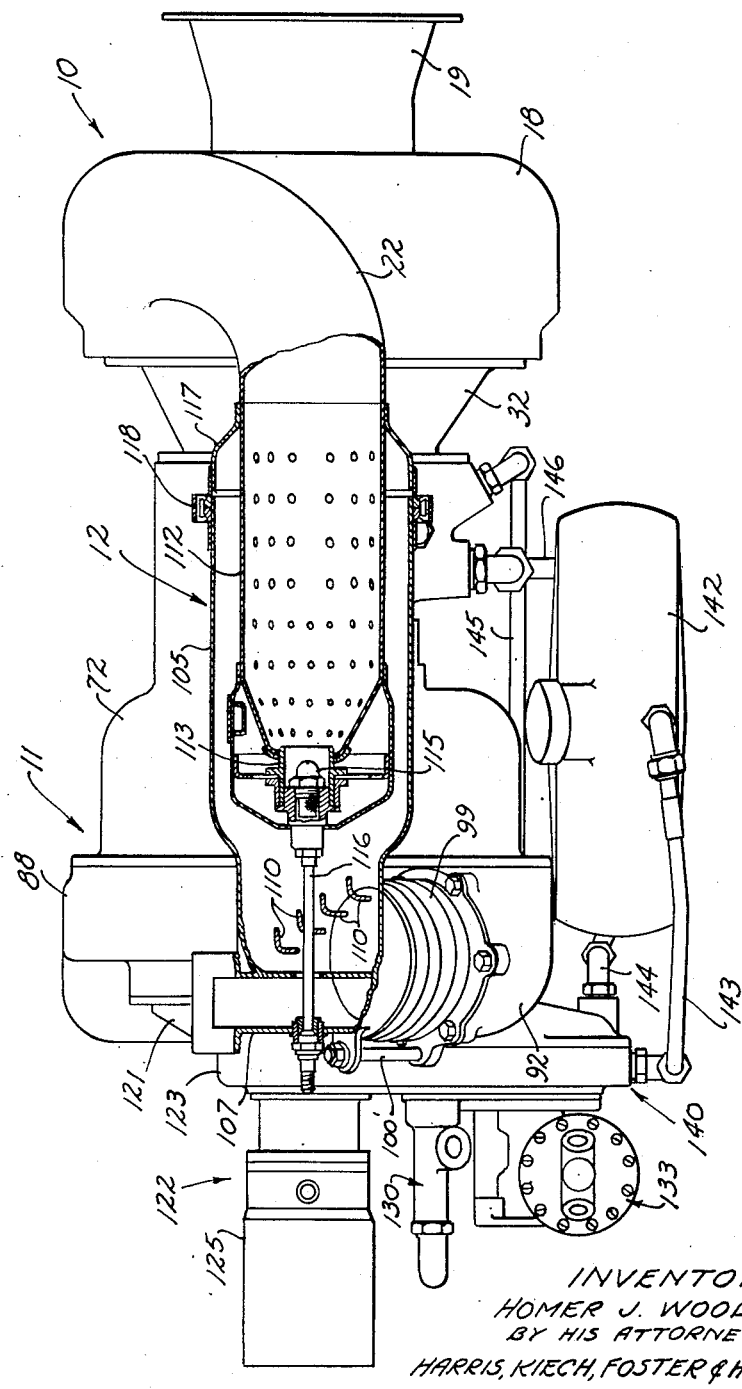
Fig. 2 is a side elevational view of the power unit, a combustion chamber being shown in section, taken on the line 2—2 of Fig. 1.

Connected to the ends of the volute discharge ducts 92 and 93 by means of flexible duct couplings 99 and 100 and a bolt 100' (Figs. 2 and 3) are elbow shaped air ducts 101 and 102, respectively. The ducts 101 and 102 have portions 103 and 104, which provide extensions of the ducts 92 and 93, and forwardly extending portions or shells 105 and 106 which are arranged substantially parallel to the axis of the power unit and which constitute the outer housings or shells of the respective combustion chambers 12 and 13 (Fig. 2). The portions 103 and 104 of the elbow shaped ducts 101 and 102 are extended laterally in air discharge tubes or branches 107 and 108 having flanged ends by which suitable ducts (not shown) can be connected. The tubes 107 and 108 constitute bleed-offs through which air compressed within the compressor unit 11 can flow to the airplane pneumatic power system. Within the elbow ducts 101 and 102 are angular vanes 110 (Figs. 1 and 2) which serve to divide the compressed air so as to divert the proper amounts into the shells 105 and 106. Disposed concentrically within the shells 105 and 106 are perforated tubes 112 which form extensions of the hot gas inlet tubes 22 and 23 of the turbine unit 10. The rearward end of each tube 112 is tapered and is connected to a sleeve 113 in which a fuel nozzle 115 is disposed, fuel being supplied to the nozzle through a tube 116 which is connected to a suitable fuel pump to be later identified in the drawings. The forward end of each shell 105 and 106 is connected to an enlarged portion 117 of the tube 112 by means of a clamping ring 118. A glow plug 119 (Fig. 1) extends through the side of each shell 105 and 106 and tube 112 and is connected in an electrical circuit, energization of the plug serving to ignite the fuel to effect combustion of the latter. The compressed air entering the tubes 112 is thus heated within the combustion chambers 12 and 13 and enters the turbine unit through the curved inlet tubes 22 and 23 and is directed against the blades 29 of the turbine wheel 30 and expanded therein to rotate the latter at a high rate of speed. Referring to Fig. 6 of the drawings, the direction of flow of the air is indicated by the arrows.

The ambient air, upon entering the inlet opening 74 of the compressor unit 11, is compressed by the two stage compressor and forced laterally through the volute discharge ducts 101 and 102 and into the combustion chambers 12 and 13 where the enthalpy of the compressed air is increased by the combustion of fuel therein, this being accomplished with as near an approach as is possible to a constant pressure desideratum. This higher energy level air is then directed by the curved inlet ducts 22 and 23 and the enclosure 18 through the nozzles to rotate the turbine wheel 30, the air then exhausting through the discharge tube 19. The flow of the air through the cycle referred to above is indicated by full line arrows in Fig. 6. During the operation of the auxiliary power plant, a portion of the compressed air is diverted through the branch tubes 107 and 108, as indicated by the dotted arrows, to the airplane pneumatic power system or to other pneumatically operated mechanisms. It is to be noted that each combustion chamber, including the shell 105 or 106, the connected ducts 101 and 102 respectively, together with the fuel nozzle 115 can be readily disassembled from the power unit by merely disconnecting the clamping ring 118 and the bolt 100'.

Attached to the rearward end of the scroll member 88 by bolts 120 is a frame 121 (Figs. 2, 3 and 4). Detachably connected to the frame 121 is an accessory unit, indicated generally by the reference character 122. The accessory unit 122 includes a support member or casing 123 which is secured to the frame 121 by bolts 124 and on which the several accessories are mounted. One of these accessories is an electrically operated starter 125 which has a tubular shaft extension 126 rotatable in a bearing boss 127 of the support member 123. The reference numeral 129 (Fig. 4) designates an overrunning clutch which functions to disconnect the starter shaft from the turbine when the turbine speed becomes greater than the starter speed or when the starter is de-energized. In either event the starter remains de-clutched until such time as both starter and turbine come to rest. The shaft extension 126 has a splined bore for receiving the rearward splined end of a relatively short, flexible starter shaft 128. The forward end of the shaft 128 is similarly splined and received in the splined portion 68 of the tubular compressor shaft 63. It is thus seen that when the starter 125 is energized, torque is transmitted through the shaft 128 to the compressor shaft 63 to rotate the compressor impellers 81 and 83 so as to initially start the power unit. After the turbine wheel 30 has started to rotate in response to the passage of hot gas therethrough and the compressor impellers 81 and 83 are driven from the turbine unit, the starter motor is deenergized.

A fuel control device 130, preferably of the governor type, is also mounted on the support member 123 and has a gear 131 which is driven from a gear 132 on the tubular shaft extension 126. Also mounted on the support member 123 below the fuel control device 130 is a fuel pump 133 having a shaft 134 and a gear 135 on the shaft which meshes with a smaller gear 136 rotatable with the gear 131. An oil pump 140 is attached to the support member 123 below the fuel pump 133 (Fig. 3) and driven from the gear 135. It is thus seen that the several accessories are driven continuously by and during the rotation of the shafts 128 and 63. Since the accessories mentioned above may be of any suitable types, they are not herein shown or described in detail. The pressure lubricant system, which includes the oil pump 140, also includes an oil tank or reservoir 142 (Fig. 2) which is connected by a line 143 to the inlet port of the pump, and a by-pass line 144 leads from the by-pass port of the pump back to the reservoir. An oil pressure line 145 connected to the pump 140 supplies oil to the several bearings of the power unit, the oil then returning to the reservoir 142 through a line 146 to be recirculated.

Since the power absorbed by the compressor is a function of air flow rate, the amount of fuel burned in the combustion chambers is determined by air flow rate. Control is accomplished by maintaining substantially constant turbine speed through the agency of the governor. Thus, an increase in supply air flow tends to absorb more power, the power unit tends to reduce in speed and the governor increases the fuel supplied in order to compensate for this reduction in speed.

It will be observed from the foregoing that the present invention provides a hot gas turbine compressor power unit which is particularly adapted for supplying compressed air for use in various pneumatically operated controls and mechanisms. However, it is within the concept of this invention to provide a direct mechanical power take-off in the nature of a gear box, or the like, connected to be driven from the compressor shaft, such an embodiment of the invention being described hereinafter.

It is also to be noted that the mechanical design of the power unit is such that major components are made as separate assemblies capable of being readily interchanged. For example, the hot gas turbine has an independent bearing mounting and may be readily connected to or detached from the compressor as a complete assembly. Similarly, the compressor and accessory case are made as separate units adapted to be connected to and disassembled from the power unit. The combustion chambers are likewise readily disassembled without disturbing the other components of the power unit. The power plant is particularly adapted for use as an auxiliary power supply aboard an aircraft since it is extremely compact, light in weight and highly efficient in operation.

The invention has thus far been described as embodied in a turbo-compressor unit in which a portion of the air compressed by the compressor unit is discharged from the unit and utilized as a source of pneumatic power for operating various aircraft controls or air-driven mechanism. It is within the concept of the invention, however, to provide a turbo-compressor power unit in which the compressor shaft is utilized as the source of direct power for operating an aircraft generator or other equipment. Such a modified version of the power unit is disclosed in Fig. 7 and constructed in the manner next described.

In the alternative structure illustrated in Fig. 7, the turbine unit and the air compressor unit may be of substantially the same construction as previously described in connection with the embodiment shown in Figs. 1 to 6 and therefore are not shown in detail. In this alternative embodiment, in some cases the compressed air is not bled off for the purpose of providing pneumatic power and for this reason the air ducts 101 and 102 have no branch lines 107 and 108 but rather these ducts merely have curved elbows. Because of this fact, it will be apparent that a compressor unit of smaller capacity or a turbine unit of larger size may be desirable.

Figure 7:
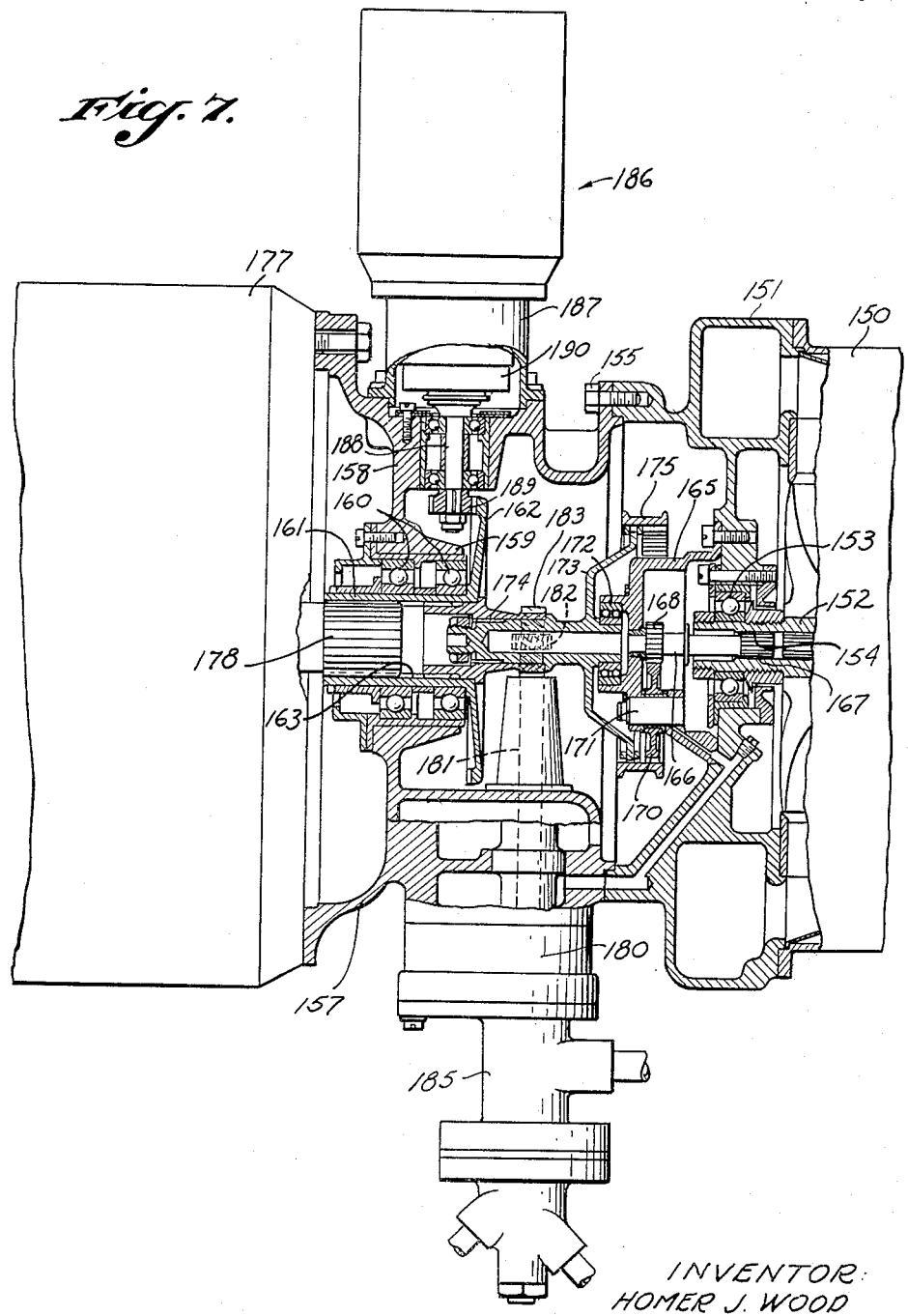
Fig. 7 is a longitudinal sectional view through the rearward end of a turbo-compressor power plant, showing a modified type of power take-off means in the form of a mechanical transmission by which an electrical generator is driven.

In Fig. 7, the reference character 150 designates the rear portion of the compressor housing and 151 represents the scroll member or discharge member which is bolted to the end of the compressor housing and which is substantially the same as the member 83 described in connection with the embodiment illustrated in Figs. 1 to 6. The rearward end of the tubular compressor shaft 152 is rotatable in an anti-friction bearing 153, disposed axially within the air discharge member 151, and has an internally splined portion 154.

Secured to the rearward end of the air discharge member 151, by bolts 155, is an annular transmission housing 157 which has a rear end plate 158 provided with a hub 159 having a bore in which anti-friction bearings 160 are retained by suitable means clearly shown in the drawing. Rotatable in the bearings 160 is the sleeve-like hub 161 of a relatively large face gear 162 having a splined bore 163 disposed in axial alignment with the axis of the compressor shaft 152.

Fastened to the rearward face of the air discharge member 151 is a cup-shaped support member 165 which has a bore in which the rearward end of a relatively short shaft 166 is rotatable, the forward splined end 167 of this shaft engaging in the splined portion 154 of the compressor shaft 152 so as to be rotated thereby, the shaft 166 being provided with a gear 168. A plurality of larger gears, one of which is shown at 170 as rotatable on a pin 171 extending between the sides of the lower forked end of the support member 165, meshes with the gear 168 to be driven thereby. Rotatable within an anti-friction bearing 172, mounted in the support member 165, is one end of a hub member 173, the other end of which is secured within the hub portion 161 of the ring gear 162. The hub member 173 carries a ring 175 having internal gear teeth meshing with the teeth of the gear 170. By this arrangement of gears, when the compressor unit is in operation, power is transmitted from the shaft 152 through the gear 168, gear 170 and ring gear 175 to rotate the hub member 173 and the ring gear 162 connected thereto.

The power derived from the shaft 152 can be utilized for driving machines or equipment of various types. As an example, the power transmission mechanism illustrated in Fig. 7 may be advantageously employed for driving an electrical alternator, such as indicated at 177. In this case, the shaft 178 of the alternator 177 has a splined end which engages in the splined bore of the gear hub 161 so as to be rotated thereby. It is thus seen that when the compressor shaft 152 is rotated, the alternator 177 is operated thereby. As will be apparent, it is necessary that the alternator 177 be operated at a constant speed and this is attained by operating the compressor at a constant predetermined speed.

The power transmission described above also operates accessories for the turbo-compressor power plant, one of these being an oil pump 180 which is bolted to the bottom of the transmission housing 157. The pump 180 has a shaft 181 provided with a gear 182 which meshes with a similar gear 183 formed integral with the hub of the ring gear 162. It is thus seen that during operation of the air-compressor the oil pump 180 is driven thereby. The shaft 181 is connected to operate a fuel pump 185 attached to the lower end of the oil pump 180, this connection and the pumps being of any suitable construction and therefore not disclosed in detail.

An electrical starter 186 has its casing 187 secured to the annular wall of the transmission housing 157 and has a shaft 188 provided with a gear 189 disposed within the housing and meshing with the ring gear 162. To start the turbo-compressor power plant, the starter 186 is energized to cause its gear 189 to rotate the ring gear 162, hub member 173, gears 170 and 168, shaft 166 and compressor shaft 152. After the turbo-compressor power unit attains the speed necessary for operation, the starter 186 is automatically or manually deenergized. An overrunning clutch 190 (Fig. 7) is employed for the purpose of disconnecting the starter shaft 188 from the turbine, this clutch being similar to and functioning in the same manner as the clutch 129, discussed previously.

I claim as my invention:

A power plant, comprising: an air compressor unit having a double-volute compressed air discharge housing; a hot gas turbine unit having an inlet housing and a driving connection with said compressor unit; a single pair of discharge ducts for compressed air, said discharge ducts being laterally spaced from the opposite sides of the power plant and respectively connecting said volutes with said turbine inlet housing; a combustion chamber in each of said discharge ducts between said units; a bleed connection for bleeding compressed air from each of said discharge ducts prior to reaching said combustion chambers; and an air inlet connection for said compressor unit, said air inlet connection intersecting a plane normal to the power plant axis which plane passes through both said combustion chambers, said air inlet connection being substantially equally angularly spaced from both said combustion chambers, and said air inlet connection being substantially spaced upwardly from a plane extending through the upper surfaces of both of said combustion chambers, whereby air is supplied to said compressor unit without substantial heating by said combustion chambers to permit air to be bled from said bleed connections for pneumatic power purposes.

HOMER J. WOOD.

References Cited in the file of this patent

UNITED STATES PATENTS

| Number | Name | Date |
|---|---|---|
| 1,895,003 | Meyer | Jan. 24, 1933 |
| 2,117,131 | Auger | May 10, 1938 |
| 2,296,701 | Butler | Sept. 22, 1942 |
| 2,305,226 | Stalker | Dec. 15, 1942 |
| 2,322,824 | Buchi | June 29, 1943 |
| 2,346,032 | Kinnucan | Apr. 4, 1944 |
| 2,405,284 | Birmann | Aug. 6, 1946 |
| 2,435,836 | Johnson | Feb. 10, 1948 |
| 2,444,659 | Lundquist | July 6, 1948 |
| 2,452,581 | Lehmann | Nov. 2, 1948 |
| 2,459,709 | Lysholm | Jan. 18, 1949 |
| 2,465,099 | Johnson | Mar. 22, 1949 |
| 2,473,356 | Birmann | June 14, 1949 |
| 2,482,394 | Wyman | Sept. 20, 1949 |
| 2,487,842 | Whiteman | Nov. 15, 1949 |
| 2,516,066 | McLeod | July 18, 1950 |

OTHER REFERENCES

"The Aviation News," Feb. 1947, pages 49–52.